June 5, 1973 J. L. KING 3,737,358

SPLICER HEAD ASSEMBLY FOR USE IN SPLICING TAPE TO LEADERS

Filed May 27, 1971 5 Sheets-Sheet 1

INVENTOR.
JAMES L. KING

BY Schiller & Pandiscio

ATTORNEYS

SPLICER HEAD ASSEMBLY FOR USE IN SPLICING TAPE TO LEADERS

Filed May 27, 1971 5 Sheets-Sheet 2

INVENTOR.
JAMES L. KING
BY
Schiller & Pandiscio
ATTORNEYS

SPLICER HEAD ASSEMBLY FOR USE IN SPLICING TAPE TO LEADERS

Filed May 27, 1971

5 Sheets-Sheet 3

INVENTOR.
JAMES L. KING
BY
Schiller & Pandiscio
ATTORNEYS

SPLICER HEAD ASSEMBLY FOR USE IN SPLICING TAPE TO LEADERS

Filed May 27, 1971 5 Sheets-Sheet 4

INVENTOR.
JAMES L. KING
BY
Schiller & Pandiscio
ATTORNEYS

INVENTOR.
JAMES L. KING
BY
Schiller & Pandiscio
ATTORNEYS

United States Patent Office 3,737,358

Patented June 5, 1973

3,737,358

SPLICER HEAD ASSEMBLY FOR USE IN SPLICING TAPE TO LEADERS

James L. King, Sudbury, Mass., assignor to King Instrument Corporation, Waltham, Mass.

Filed May 27, 1971, Ser. No. 147,376

Int. Cl. B31f *5/06;* B65h *19/20*

U.S. Cl. 156—502 17 Claims

ABSTRACT OF THE DISCLOSURE

A splicing assembly for cutting and splicing magnetic tape to leaders. The assembly consists of first and second splicing blocks. The first block has two tape-receiving grooves and the second block has one tape-receiving groove. Each groove is adapted to hold a tape in place by suction. The assembly also includes a knife unit operative to sever a tape that extends from one block to the other, and means are provided for moving one block relative to the other so as to selectively align either of the two grooves of the first block with the single groove of the second block. A splicing tape dispenser is used to splice a tape on one block to a tape on the other block.

This invention relates to winding machines and more particularly to machines for splicing and winding tapes into cassettes.

The primary object of this invention is to provide a new and improved apparatus for splicing tape.

A more specific object of the invention is to provide a new splicing head assembly for use in machines for splicing and winding tapes into cassettes.

A further specific object is to provide a splicing head assembly for magnetic tape winding and splicing machines that is compact, fast-acting, and can be made at relatively low cost.

Still another object of the present invention is to provide a new splicing head assembly of the character described that includes novel means for applying suction so as to hold the ends of tape in position on the splicing head.

Magnetic tape cassettes, e.g. of the type shown in U.S. Pats. 3,423,038 and 3,167,267, are customarily available commercially with blank (i.e., unrecorded) tape or with prerecorded tape. Usually the cassette consists of a cassette case containing two rotatable spools or hubs, a leader attached to each spool or hub, and a predetermined length of magnetic tape having its ends spliced to the two leaders. In the manufacture of such cassettes, the common practice is to start with an empty cassette consisting of the cassette case with the two hubs and a single length of leader tape having one end connected to one hub and the other end connected to the second hub. The first step in filling the cassette with blank or pre-recorded tape is to cut the leader tape to form two discrete leaders. Then the magnetic tape to be wound into the cassette is spliced to one leader and the hub to which the one leader is connected is rotated to wind up a given length of magnetic tape. Thereafter the magnetic tape is cut and the trailing end of the given length of magnetic tape is spliced to the leader attached to the other hub. An alternative procedure is to start with only the two hubs each having a short leader, splice magnetic tape to the leader on one hub, wind a given amount of tape on that one hub, splice the trailing tape to the leader on the other hub, and thereafter mount the two hubs in a cassette case. Accordingly, still another object of the invention is to provide a splicing head which may be used to splice tape to leaders of cassette hubs according to the foregoing alternative modes of manufacture.

Another object of the invention is to provide a new and improved splicing head assembly of the character described which includes a cutter mechanism for splicing tape and a magnetic read head for use in sensing "Q" signals on pre-recorded tape. Such "Q" signals are provided on pre-recorded tape to indicate where a tape is to be severed and spliced to a leader.

The foregoing objects and other objects which are obvious to persons skilled in the art from the following specification are achieved by a splicing head assembly which comprises two splicing blocks. One splicing block has a guideway for aligning tape to be spliced and the block is also provided with means for applying suction to hold a tape in position in the guideway. The second splicing block has two guideways which extend parallel to each other and to the guideway of the first splicing block and is provided with means for applying suction to hold a tape in place in each of its guideways. The two blocks are disposed immediately adjacent to one another and are mounted so that one block is moveable relative to the other in reciprocal fashion along an axis transverse to the guideways. Means are provided for shifting one block relative to the other along said axis so as to selectively align either of the two guideways of the second block with the guideway of the first block. Also associated with the splicing head assembly is a cutter mechanism which includes a knife having a knife edge aligned with the line of separation between the two splicing blocks. The cutter mechanism is adapted for reciprocal operation so as to cause its knife blade to move back and forth along the line of separation between the two splicing blocks, whereby the knife edge will sever any tape extending from one block to the other across the line of separation. One of the blocks of the splicing head assembly may also be provided with a magnetic read head for sensing pre-recorded "Q" signals.

Other features and many of the attendant advantages of the invention are set forth or rendered obvious by the following detailed specification which is to be considered together with the following accompanying drawings wherein.

Figure 1:
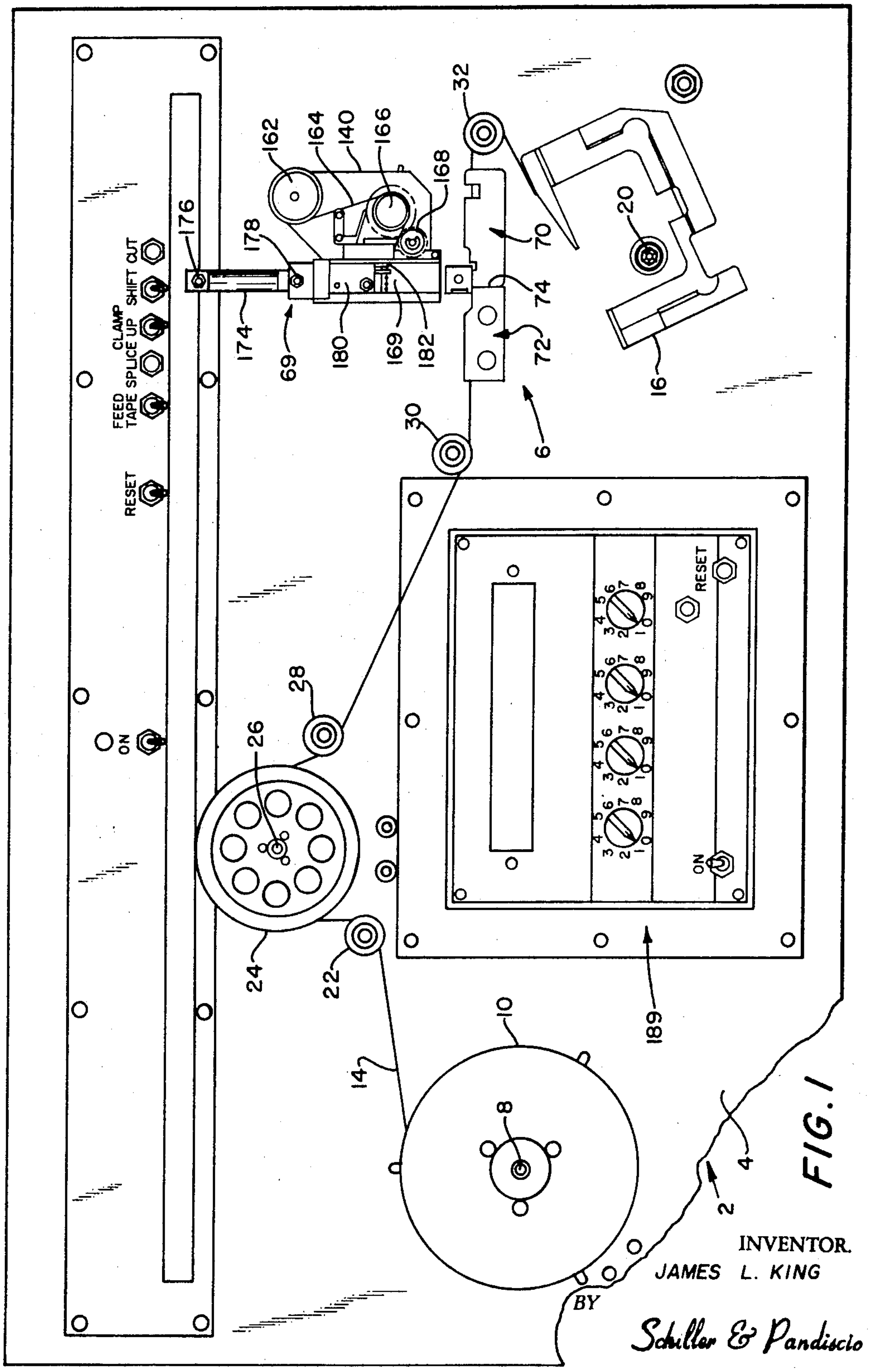
FIG. 1 is a front elevation of a cassette tape winding and splicing machine embodying a splicing head assembly constructed in accordance with this invention.
Figure 2:
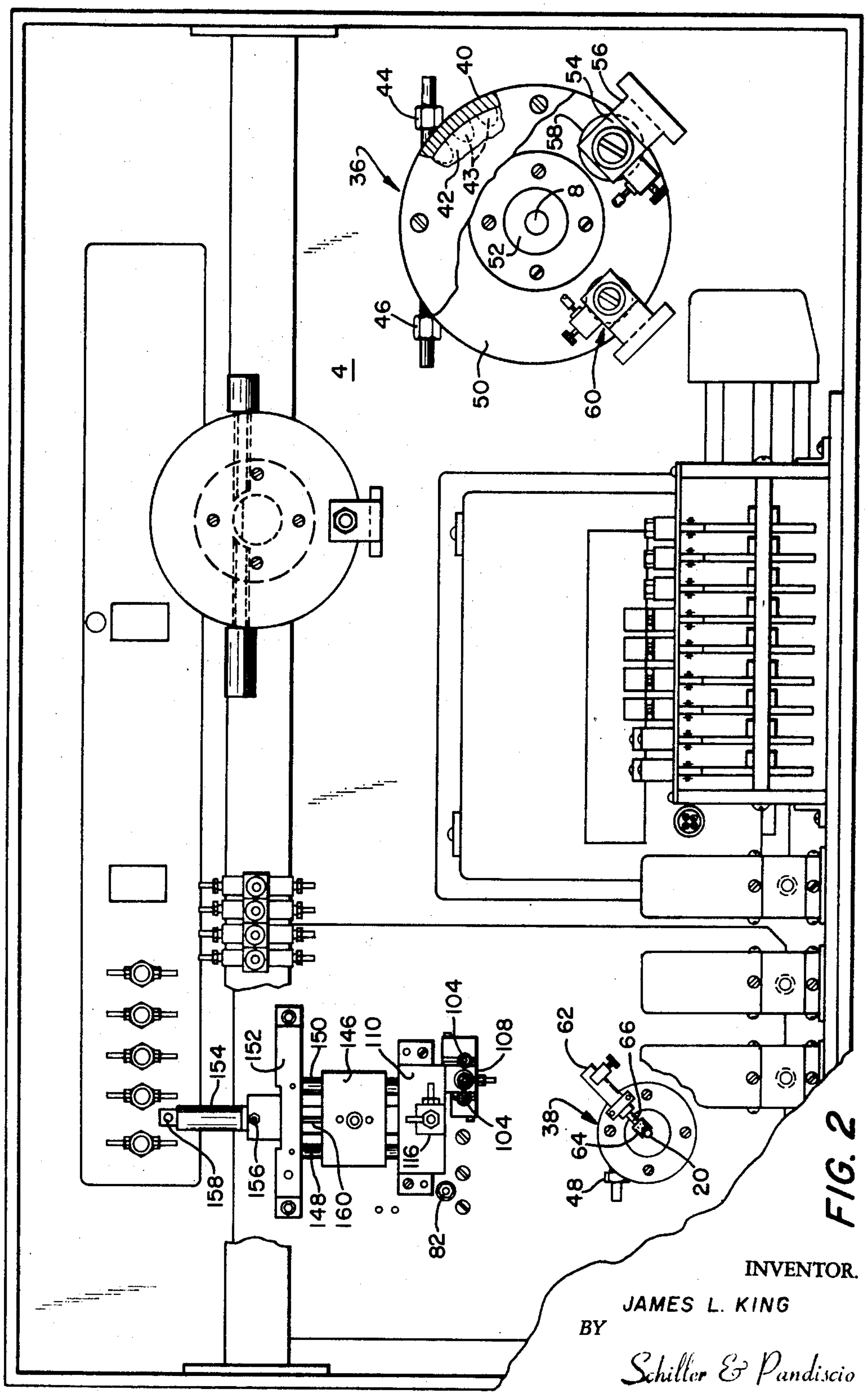
FIG. 2 is a rear view of the winding machine of FIG. 1, with certain elements omitted for convenience of illustration.

Turning now to FIGS. 1 and 2, the illustrated cassette tape splicing and winding machine comprises a console 2 having a front panel 4 which supports a splicing head assembly 6 constructed in accordance with the present invention and also a splicing tape dispensing mechanism 69. The machine further includes a rotatable shaft 8 which projects through front panel 4 and supports a reel 10 on which is wound a supply of magnetic tape 14 that is to be used in filling cassettes.

Figure 5:
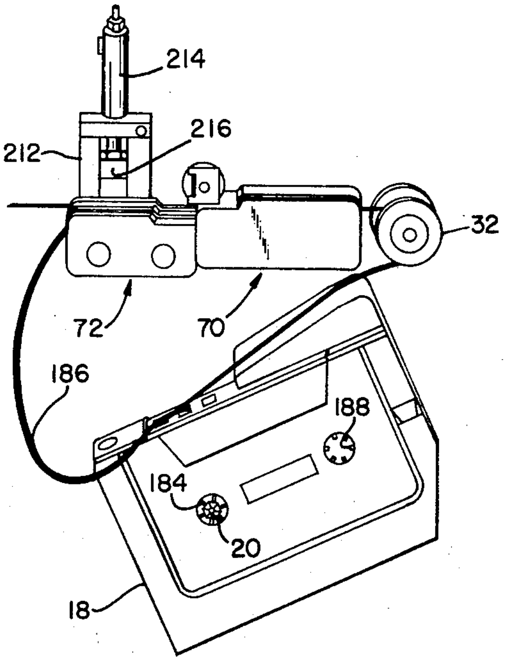
FIG. 5 is a perspective view showing how the leader of a pre-leadered cassette is disposed on the splicing head assembly.

Also mounted on the front panel 4 is a cassette holder 16 adapted to hold a cassette 18 (see FIG. 5). The machine also includes a rotatable winding spindle 20 that projects out of front panel 4. Spindle 20 is adapted to mate with and drive one of the hubs of a cassette mounted in holder 16.

Figure 6:
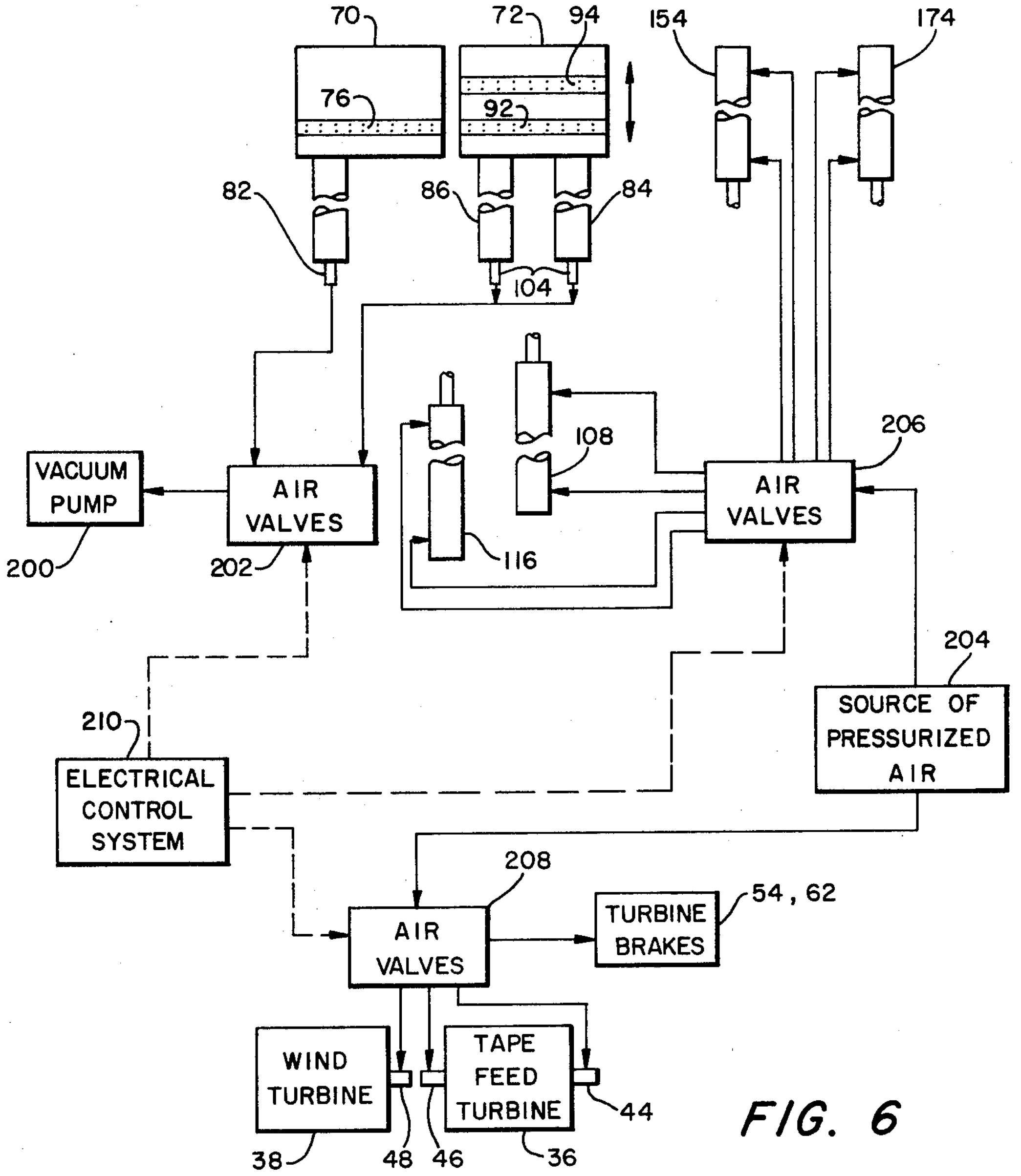
FIG. 6 illustrates relevant portions of the electropneumatic control system of the machine.

Tape 14 is paid out from reel 10 over a guide roller 22 and around a large footage counting wheel 24 which is mounted on a shaft 26 rotatably supported in the panel of the machine. From wheel 24 the tape passes around two additional guide rollers 28 and 30 to the splicing head assembly 6. A fourth guide roller 32 is provided for guiding tape extending from the splicing head assembly to a cassette (not shown) mounted in holder 16. The four guide rollers are mounted on stub shafts mounted to panel 4. The supply reel shaft 8 and the winding spindle 20 are connected to and driven by two air turbines 36 and 38 (see FIG. 2) which are affixed to the rear side of front panel 4. The turbine 36 comprises a hollow housing 40 in which is mounted a rotor 42 that is coupled to shaft 8. Rotor 42 has a plurality of cavities 43. Housing 40 has two air inlets 44 and 46 which are connected by hoses to appropriate air supplies and air valving mechanism. Air supplied via inlet 44 acts on cavities 43 to cause the rotor 42 to rotate counterclockwise (as seen in FIG. 2) so as to cause reel 10 to pay off tape for delivery to the splicing head. Air supplied via inlet 46 of the tape supply turbine 36 acts on cavities 43 and so causes the rotor to rotate in a clockwise direction (as seen in FIG. 2) whereby to cause reel 10 to rotate in a direction to pull tape away from the splicing head assembly. The other turbine is of similar construction but has only a single inlet 48 which is connected to an air supply and to an appropriate valving mechanism. Each of the turbines is also provided with braking means for stopping rotation of the shaft 8 and spindle 20 and for holding the supply reel stationary during a splicing operation. Various forms of braking mechanisms may be used. By way of example, the turbine 36 for the supply reel is provided with a brake disc 50 attached to a hub 52 mounted on the rear end of shaft 8. Cooperating with brake disc 50 is a brake mechanism consisting of a conventional fluid actuator 54 attached to a bracket 56 that is mounted to the rear of the front wall of the machine. The fluid actuator has a brake pad 58 attached to the end of its operating piston rod. When the actuator is supplied with air so as to cause its piston rod to be extended, the brake pad engages disc 50 and thus causes the rotor of turbine 36 to come to a stop. When the fluid actuator is supplied with air so as to retract its piston rod, the brake pad is disengaged from the brake disc so that the turbine rotor is free to rotate under the influence of air supplied via one of the inlet ports 44 and 46. A second brake mechanism 60 similar to the one first described may be associated with brake disc 50. This second brake disc may be used to hold the supply reel against movement during a splicing operation as hereinafter described. The other turbine 38 has a braking mechanism which consists of a fluid actuator 62 having a block 64 attached to its piston rod 66. The block 64 has a V-shaped end slot which is sized so as to embrace the rear end of spindle 20 which projects out of the turbine. When fluid actuator 62 is supplied with air so as to extend its piston rod, the block 64 engages spindle 20 and causes it to come to a stop. Retraction of the piston rod frees the spindle for rotation under the influence of air supplied to the turbine via inlet 48. Except as shown in FIG. 6, further details of the system for controlling the turbines are omitted for convenience and brevity since such details are not essential to comprehension of the construction and function of the present invention.

Also forming part of the machine is a splicing tape dispensing mechanism 69 that is adapted to cut a piece of splicing tape from a supply reel and apply it to the abutting ends of two tapes supported on the splicing head assembly. It is to be noted that the splicing tape dispensing mechanism forms no part of the present invention and is illustrated and described hereinafter only to the extent necessary to explain the function of the splicing head assembly.

Figure 3:
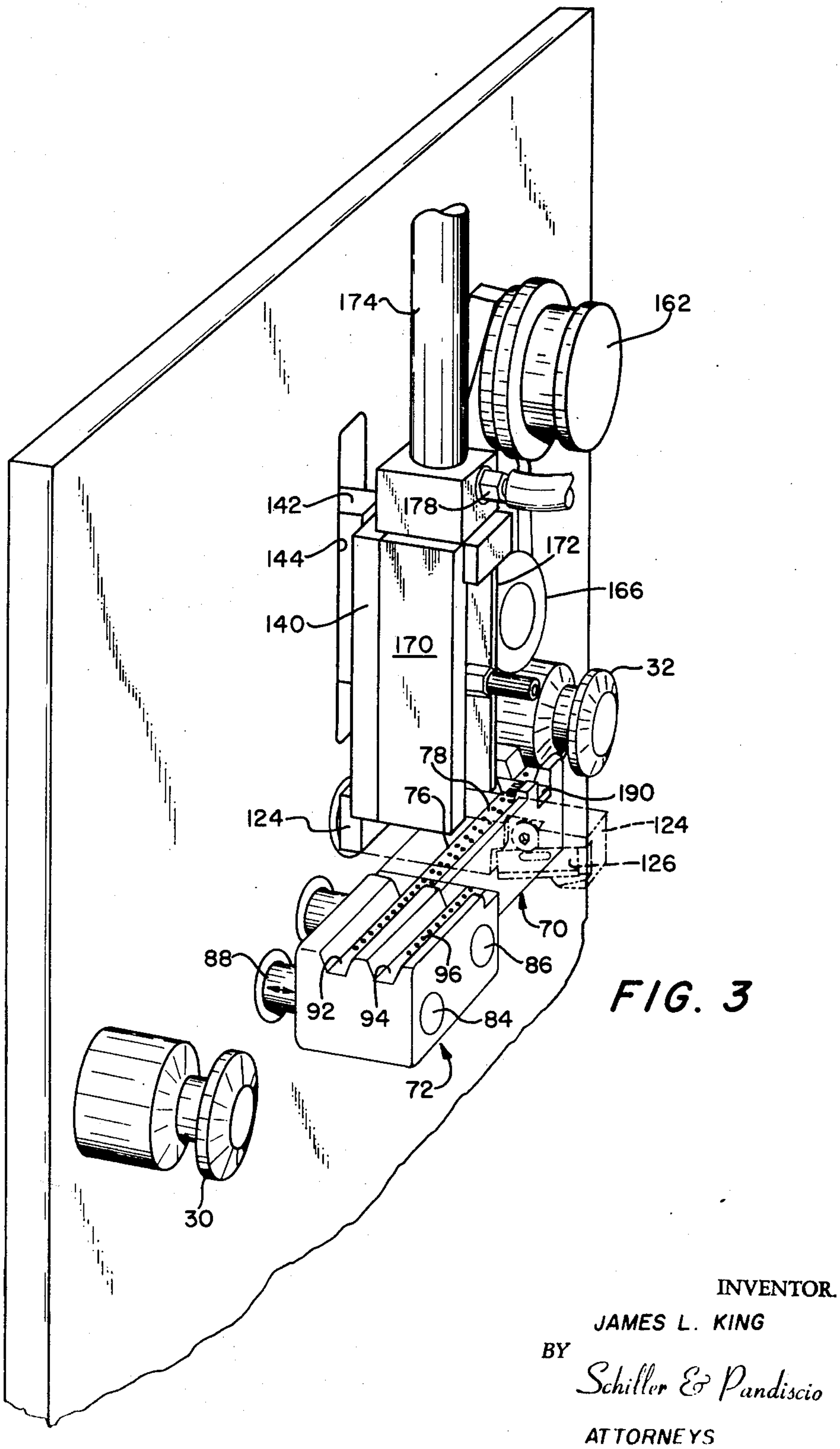
FIG. 3 is a perspective view of the splicing head assembly and a splicing tape dispensing mechanism associated with the splicing head assembly.
Figure 4:
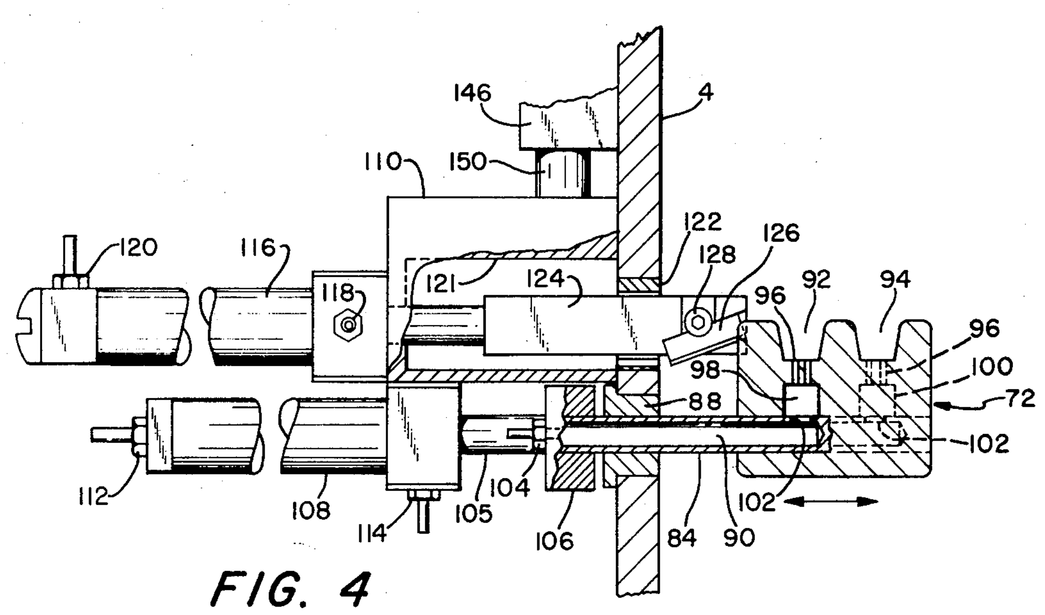
FIG. 4 is a cross-sectional view of the splicing head assembly.

Turning now to FIGS. 1, 3, and 4, the splicing head assembly 6 comprises a stationary splicing block 70 affixed to panel 4 and a moveable splicing block 72. The two blocks have mutually confronting flat vertical end surfaces identified by numeral 74 that are separated by a very narrow gap. The stationary block 70 also has a horizontally extending upper surface in which is formed a groove 76 which functions as a guideway for tape 14. The base of the groove is flat and its sides are slanted. The width of the base of groove 76 is only slightly greater than the width of tape 14 so that the tape is restrained against shifting laterally when it is stationary or when it is being transported. The base of groove 76 is provided with a series of small apertures 78. These apertures communicate with an interior passageway (not shown) in block 70 which is similar to the passageways 98 and 100 described hereinafter of block 72 and which has a port on its rear side in which is mounted a hose fitting 82 (FIG. 2). A hose (not shown) is connected to the fitting and extends to a source of vacuum through a suitable valve. Thus if tape is placed in groove 76 and vacuum is applied to the stationary splicing block via the fitting 82, a suction force will be established which will hold the tape tight against the bottom of the groove.

The movable splicing block 72 is mounted on two parallel slide rods 84 and 86 which are slidably disposed in sleeve bearing 88 mounted in front panel 4. Rods 84 and 86 are each provided with an axial bore 90. The block 72 has a horizontally extending upper surface that is formed with two guideways or grooves 92 and 94 which extend parallel to each other and to the corresponding groove 76 in the fixed splicing block 70. The grooves have flat bases and sloping sides and their bases have the same width as that of the corresponding groove 76. Splicing block 72 also has a series of apertures 96 formed in the base of each of its two grooves whereby suction may be applied to tapes positioned in the two grooves. The moveable block is provided with two interior passageways 98 and 100 located below and communicating with the apertures 96 of grooves 92 and 94 respectively, and these passageways have inlet ports that communicate with exit ports 102 formed in the two slide rods. The axial bores 90 in the two slide rods extend from the rear ends of the rods to a point short of their front ends. Hose fittings 104 are mounted in the rear ends of the two slide rods. Hoses (not shown) are connected to fittings 102 and extend to a source of vacuum through separate control valves.

It is to be noted that grooves 92 and 94 of the moveable splicing block 72 are co-planar with the single groove 76 in the fixed block 70. Accordingly, by moving block 72 in and out relative to panel 4, it is possible to align either of grooves 92 and 94 with groove 76. As shown in FIG. 3, block 72 has been moved away from panel 4 to a position in which its groove 92 is aligned with groove 76.

Turning now to FIGS. 2, 3, and 4, the two slide rods 84 and 86 are attached to a moveable cross block 106 disposed behind panel 4. Also disposed behind the panel is a fluid actuator 108. Actuator 108 is secured to a large block 110 that is affixed to panel 4.

Actuator 108 is of the double-acting type and its piston rod 105 is connected to the movable cross-block 106 as shown in FIG. 4. The two inlets of actuator 108 are provided with hose fittings 112 and 114 which are connected by means of hoses (not shown) and an appropriate control valve to a source of pressurized air. Thus, if air is applied to actuator 108 via its fitting 112, its piston rod will be extended and will move the movable splicing block 72 outwardly far enough to place its groove 92 into alignment with groove 76 of splicing block 70. When air is applied to actuator 108 through its fitting 114, the actuator's piston rod is retracted, moving the splicing block 72 up against the panel 4 so as to place its groove 94 into alignment with groove 76 of block 70.

Also forming part of the splicing head assembly is a knife mechanism which comprises an actuator 116 which is affixed to the block 110 described hereinabove. Actuator 116 is a double-acting unit, having hose fittings 118 and 120 at opposite ends of its cylinder. The block 110 has an opening 121 through which extends the piston rod of actuator 116. As seen in FIG. 4, the panel 4 has an aperture in which is disposed a bushing 122. Bushing 122 is essentially a cylindrical sleeve that is broached on its inside surface at four equally spaced points so as to form four right angle corner guide slots that slidably locate and support an elongate cutter blade support arm 124 of square cross section. Arm 124 is affixed to the end of the piston rod of actuator 116 so that as the piston rod is reciprocated the arm will slide axially in the bushing 122. When arm 124 is in its retracted position, only a portion of its forward end projects out of the bushing 122 as shown in full line in FIG. 4. The extended portion of arm 124 is shown in dotted lines in FIG. 3. FIG. 4 shows arm 124 extended only part way. It is to be noted that arm 124 is slotted on one side at its forward end to accommodate a cutter blade 126 which is secured thereto by a screw 128. The cutter blade is mounted with its cutting edge facing down and in line with the small gap between the two splicing heads 70 and 72. The cutter blade 126 also is mounted on arm 124 so that its cutting edge is inclined as shown in FIGS. 3 and 4. When the piston rod of actuator 108 is fully retracted, arm 124 is withdrawn far enough for the front end of its blade to be disposed between the groove 76 and panel 4 so as not to interfere with movement of tape along groove 76. When the piston rod of actuator 108 is extended, the cutting edge of the cutter blade 126 slices through whatever tape is extending across from the groove 76 to one of the grooves 92 and 94. Since the cutter blade edge is slanted, the cutter produces a clean shearing action on the tape without at the same time forcing the tape out of the grooves.

The splicing tape dispensing unit 69 is adapted to apply a piece of splicing tape to the abutting ends of tape supported by the two splicing blocks. As indicated previously, the splicing tape dispensing unit 69 forms no part of the present invention and may be replaced by other equivalent units capable of performing the same function of applying splicing tape. Accordingly, the tape dispensing unit 69 is described hereinafter only to the extent necessary to facilitate understanding of the operation and advantage of the splicing head assembly described above.

The splicing tape dispensing unit comprises a carriage plate 140 (FIG. 3) that is attached to an arm 142 that extends through a slot 144 in panel 4 and forms part of a slide block 146 located on the rear side of panel 4. Slide block 146 is slidably mounted on two slide rods 148 and 150 whose opposite ends are secured in block 110 mentioned previously and a second block 152. Block 152 is affixed to the rear side of panel 4. Mounted on block 152 is a double-acting fluid actuator 154 having hose fittings 156 and 158 at the opposite ends of its cylinder. Hoses (not shown) connect the hose fittings 156 and 158 to a suitable supply of pressurized air through suitable valving mechanism. The piston rod 160 of actuator 154 extends through a hole in block 152 and is secured to the slide block 146. Thus, by suitable application of air to actuator 154, the slide block 146 can be made to reciprocate up and down on slide rods 148 and 150. Referring now to FIGS. 1 and 3, the carriage plate 140 carries a reel 162 that contains a supply of splicing tape 164 of the type having a pressure sensitive adhesive coating on one side. The carriage plate 140 also carries a feed roll 166 and a feed roll 168 that are mounted on suitable shafts rotatably mounted to plate 140. Tape 164 passes around roll 166 and between that roll and roll 168. The tape dispensing unit also includes a plurality of means (not shown) which cause rolls 166 and 168 to rotate clockwise and counterclockwise respectively (as seen in FIG. 1) when the carriage plate 140 is moved upwardly and which prevent rotation of the same rolls when the carriage plate moves downwardly. When the carriage plate moves upwardly, the resulting rotation of rolls 166 and 168 causes a predetermined amount of splicing tape from supply reel 162 to be advanced. The leading end of the splicing tape passes into and extends across a vertical channel 169 defined by two spaced vertically extending plates 170 and 172 that are attached to carriage plate 140. Plate 172 has a horizontal slit (not shown) for admitting the tape to the guide channel. Attached to and supported by the upper ends of plates 170 and 172 is another fluid pressure actuator 174 of the double-acting type. Actuator 174 has hose fittings 176 and 178 at the opposite ends of its operating cylinder. Attached to the end of the piston rod of actuator 174 is a plunger 180 that is mounted between and guided by the two plates 170 and 172. The plunger 180 carries a cutter blade 182 that slides along the inner face of plate 172. Plunger 180 is shown in FIG. 1 in its "up" or retracted position. When air is applied to actuator 174 through its fitting 176, plunger 180 moves down in the guide channel. As it moves down the cutter blade 182 severs tape 164 at a point close to guide plate 172, thereby providing a short section of splicing tape in the path of plunger 180. The latter drives the short section of tape down onto the two splicing blocks 70 and 72 in lines with the groove 76. When carriage plate 140 moves up again, splicing tape is advanced into the guide channel 169 by rolls 166 and 168 so that another section of tape may be cut and applied on the next downward stroke of the carriage plate.

Referring now to FIG. 5, the manner in which the splicing head assembly is used in a machine so as to splice magnetic tape to leaders of a tape cassette will now be described. Initially magnetic tape is unwound from reel 10 and passed over the counting wheel 24 as shown in FIG. 1 far enough for its leading end to be positioned on the groove 92 of movable splicing block 72. At this time, vacuum is applied through the axial bores in both slide rods 84 and 86 so that the tape will be held in groove 92 by suction. Suction is also applied through fitting 82 to splicing block 70. The magnetic tape 14 is positioned on splicing block 72 so that its leading end extends up to the line of separation between the two splicing blocks. Then a pre-leadered cassette 18 is mounted in holder 16 so that its left-hand hub 184 is locked to the spindle 20. It is to be noted that a preleadered cassette is one having a length of leader tape 186 attached to its two hubs. Sufficient leader tape is provided in the cassette 18 to permit the leader tape to be pulled out far enough to be placed over the two splicing blocks. As seen in FIG. 5, the leader tape 186 is pulled out to form a large loop which is reversed so that the leader extends from hub 184 upwardly around the guide roll 32, then along the grooves 76 and 94 of splicing blocks 70 and 72, and then back to the second hub 188 of the cassette. The leader tape is held in place in grooves 76 and 94 by suction. Initially splicing block 72 is retracted so that groove 94 is aligned with the groove 76, whereby the loop of leader 186 can be disposed in these two grooves 92 and 76 as above described. Thereafter the cutter mechanism is actuated to cause the cutter arm 124 to move out over the two splicing blocks whereby its cutting blade 126 severs the leader tape 186 into two discrete leaders, one supported on splicing block 70 and connected to hub 184, and the other supported on splicing block 72 and connected to hub 188. As soon as the cutter arm 124 has returned to its original retracted position, the actuator 108 is caused to shift the splicing block 72 away from the panel 4 to the position shown in FIG. 3 so that the magnetic tape resting in groove 92 is now aligned with the leader supported by splicing block 70. Thereafter the tape dispensing unit 69 is operated. It is to be noted that the unit 69 is normally in the elevated position shown in FIGS. 1 and 3. When it is operated, its carriage plate 140 moves downward far enough for the bottom ends of the plates 170 and 172 to be close to or lightly contact the tapes resting in grooves 72 and 92. At that point the actuator 174 is caused to move the plunger 180 downward. Assuming that splicing tape has previously been fed into the space between plates 170 and 172, downward movement of plunger 180 will cause its cutter 182 to sever the splicing tape, and the severed section of splicing tape is then driven downward by plunger 180 onto the adjacent ends of the leader supported by splicing block 72. Plunger 180 is immediately retracted, and as this occurs, the carriage plate 140 is also retracted to its original raised position. Once the tape 14 has been spliced to the leader supported by splicing block 70, the turbines 36 and 38 are actuated to drive shaft 8 and winding spindle 20 in a direction to wind tape onto the hub 184 of the cassette. At this point, it is to be noted that during the time that the driving spindle 20 is being rotated, vacuum is being constantly applied to the apertures 96 of the groove 94 so as to hold in place the leader that is attached to the hub 188. Vacuum may continue to be applied to the grooves 76 and 92 as the tape is being wound since any suction effect will not prevent the tape from being pulled by rotation of spindle 20. Preferably, however, vacuum is turned off with respect to those two grooves during the winding operation. Once a predetermined amount of tape has been wound on hub 184, shaft 8 and spindle 20 are stopped and vacuum is reapplied so as to hold the tape 14 by suction in the grooves 76 and 92. Thereafter the cutter mechanism is again actuated so as to cause cutter blade 126 to sever the tape 14 along the line of separation between the two splicing blocks. Then the actuator 108 is caused to return the splicing block 72 to its original position in which its groove 94 is aligned with the groove 76. Once this has occurred, the splicing tape dispensing unit 69 is again actuated so as to apply a section of splicing tape to the trailing end of the tape 14 resting in the groove 76 and the end of the leader 186 located in the groove 94. The leader 183 and the tape 14 attached thereto are lifted off the two splicing blocks and the guide roll 32 and the cassettes removed from the holder 16. One of the hubs 184 and 188 is then rotated so as to draw all of the tape into the cassette. A new cassette is then installed in the holder 16 with its leader pulled out and placed into the grooves 94 and 76 of the two splicing blocks, and then the cutting, splicing, and winding operations above described are repeated.

It is believed to be apparent that various amounts of tape 14 can be wound into cassette 18. Preferably the machine is provided with controls for shutting down the winding spindle 20 after a pre-selected amount of tape has been wound into the cassette. The amount of the tape that has been wound into the cassette is determined by operation of the counting wheel 24. Means (not shown) coupled to shaft 26 count each revolution of the counting wheel 24 and, for each such revolution, provide a signal which is fed into an electronic counter represented schematically at 189 which can be set to provide an output signal when a predetermined amount of tape has been transported from the supply reel 10. The output signal of the counter may then be used to reset the counter and simultaneously operate air valving mechanism (not shown) for stopping supply reel shaft 8 and winding spindle 20.

It is to be noted that it is common practice in the manufacture of cassettes to load the cassettes with pre-recorded tape. Thus, the supply reel 10 will carry a quantity of tape containing a series of identical recordings, e.g., a series of so-called "albums" of music. In such case, it is common practice to record a "Q" signal between each album, such signal indicating that one album has finished and another album is about to start. For processing pre-recorded tape, it is preferred to provide means for sensing the "Q" signal. Such means takes the form of a magnetic read head 190 which is mounted in a cavity in the splicing block 70. The read head 190 is disposed so as to be lightly engaged by tape 14 as the tape is being transported to the cassette. When the magnetic read head 190 senses a "Q" signal, associated electronic means (not shown) coupled to the read head produces an output signal which is used to sequentially (1) operate the valving mechanism which controls the supply of air to the two turbines and also to the brake mechanism associated with such turbines so as to stop shaft 8 and spindle 20, (2) apply air to turbine 36 via "reverse" inlet 46 to slowly draw magnetic tape from the cassette until the "Q" signal is again detected, (3) stop turbine 36, (4) cut tape 14 at the location of its "Q" signal, and (5) then splice the leader in groove 94 to the trailing end of the tape previously wound on cassette hub 184. The reverse movement of turbine 36 is at a fraction of its forward speed and is required since it is impossible to stop the tape as it is being wound into the cassette exactly when the "Q" signal is detected. Hence the tape is backed up slowly to locate the "Q" signal in the region of the cutter blade 126.

FIG. 6 schematically illustrates the control system for a winding machine employing the invention. Suction for holding tapes on the splicing blocks 70 and 72 is achieved by means of a suction pump 200 which is connected to hose fittings 82 and 104 via three air valves represented schematically at 202. Air for operating actutaors 108, 116, 154 and 174 is applied from a pressure source 204 via a plurality of air valves 206. An additional plurality of air valves 208 connects the source of pressurized air to the inlets 44 and 46 of turbine 36, inlet 48 of turbine 38 and the brake actuators 54 and 62. Operation of the air valves so as to effect the sequential operation described above is effected by an electrical control system represented schematically at 210. It is to be noted that the control system and the actuating elements controlled thereby may take various forms obvious to persons skilled in the art. Thus the air actuators may be replaced by hydraulic actuators or solenoid type actuators while valves 202, 206 and 208 may be solenoid or cam operated. Furthermore the electrical control system may be adapted to operate in response to the output of read head 190 so as to effect operation of the machine as above described when winding prerecorded tape.

It also is contemplated that other means, in addition to or in place of the suction means hereinabove described, may be used for holding tape on the splicing blocks. Thus it is possible to employ a mechanical tape holding means mounted directly on one of the splicing blocks as disclosed in my copending application Ser. No. 9,552, filed Feb. 9, 1970, now U.S. Pat. No. 3,637,153, issued Jan. 25, 1972, for Tape Winding Machine (see actuator 88 referred to therein). It also is possible to mount a mechanical tape clamping means on panel 4. Thus as shown in FIG. 5, it is contemplated to attach a bracket 212 to panel 4 directly above splicing block 72 and to mount on that bracket a fluid actuator 214 having a resilient pressure pad 216 on the end of its piston rod. Actuator 214 is mounted so that its pressure pad 216 is aligned with groove 92 when splicing block 72 is in its retracted position, i.e., close against panel 4. Actuator 214 is connected to the source 212 of pressurized air through a suitable solenoid air valve (not shown) that is operated by the electrical control system 210 so that pressure pad 216 presses down against tape 14 only after a splicing operation has been completed and until another splicing operation with a new cassette has commenced.

It is believed to be apparent that the splicing head assembly of the present invention is simply, compact, reliable, and easy to operate. Furthermore, the splicing head assembly makes it possible to repeatedly and automatically load cassettes in the manner above described. Other advantages of the invention will be obvious to persons skilled in the art.

What is claimed is:

1. A splicer head assembly for use in splicing tape to leaders comprisng a first block having a first guideway for a first tape, means for holding a tape in position along said guideway, a second block having second and third guideways for second and third tapes, said second and third guideways being parallel to each other, means for holding a tape in position along each of said second and third guideways, said second block being disposed so that said one end of said first guideway is co-planar with an adjacent end of each of said second and third guideways, and means for moving one of said blocks with respect to the other between a first position in which said second guideway is aligned with said first guideway and a second position in which said third guideway is aligned with said first guideway.

2. A splicer head assembly according to claim 1 wherein said first block is secured to a panel and said second block is movably mounted to said panel.

3. A splicer head assembly according to claim 2 wherein said means for moving said second block is a fluid actuator having a cylinder secured to said panel and a reciprocal actuating rod secured to said second block so that said block and rod move as a unit.

4. A splicer head assembly acording to claim 1 wherein said second block is supported by at least one slide rod mounted for reciprocal movement transversely of said guideways.

5. A splicer head assembly according to claim 1 wherein at least one of said means for holding tape is a means for applying suction to a tape positioned in one of said guideways.

6. A splicer head assembly according to claim 5 wherein said first block is secured to a panel and further including a slide rod to which said second block is secured so that its two guideways extend transversely to said at least one slide rod, means attached to said panel supporting said at least one slide rod for reciprocal movement transversely to the plane of said panel, and further wherein said suction-applying means comprises a passageway that extends through said slide rod, one end of said passgeway leading to a source of suction and another end of said passgeway communicating with one of the guideways of said second block.

7. A splicer head assembly according to claim 1 wherein said first and second blocks are immediately adjacent to each other and have corresponding horizontally extending surfaces, and further wherein said guideways are grooves formed in said surfaces.

8. A splicer head assembly according to claim 7 further including a knife blade having a cutting edge aligned with the line of separation between said blocks and disposed so that when it is moved along said line it will sever a length of tape that is disposed so as to extend from the guideway of said first block to a guideway of said second block, and further including means for reciprocating said knife blade so as to move first in one direction and then in the opposite direction along said line of separation.

9. A splicing head assembly for use in splicing two leaders to the opposite ends of a length of recording tape, said splicing held assembly comprising first and second splicer blocks with said first block comprising two tapes receiving grooves in one surface thereof and said second block comprising a like tape receiving groove in a corresponding surface thereof, said grooves being parallel to each other, said splicer blocks also having adjacent end surfaces with one block movable relative to the other block along an axis extending parallel to said end faces and transversely to said grooves, means for moving said block back and forth along said axis so as to selectively align either of the two grooves of said first block with the like groove of said second block.

10. A splicing head assembly according to claim 9 further including means for releasably holding tape in said grooves.

11. A splicing head assembly according to claim 9 further including a cutter positioned in line with the line of separation between said adjacent end surfaces for slitting tape extending from the one surface of said first block to the corresponding surface of said second block.

12. A splicing head assembly comprising first and second splicing blocks, a support for said splicing blocks, means securing said first block to said support, an actuator connected to said support having a reciprocal operating member and adapted to move said operating member from one to the other of first and second positions, means slidably mounting said second block on said support, means connecting said operating member to said second block so that said second block moves with said operating member, said first block having first tape guide means for positioning the end of a first tape on said first block, and said second block having second and third tape guide means for positioning the ends of second and third tapes on said second block so that one of said second and third tapes is aligned with the tape positioned on said first block when said operating member is in one of said first and second positions and the other of said second and third tapes is aligned with the tape positioned on said first block when said operating member is shifted to the other of said first and second positions.

13. A splicer head assembly according to claim 1 wherein said first block is stationary and said second block is mounted for movement with respect to said first block.

14. A splicer head assembly according to claim 1 further comprising means on one of said blocks for sensing a prerecorded signal on one of said tapes.

15. A splicing head assembly comprising first and second tape support members, means for holding a first tape on said first tape support member, means for holding second and third tapes on said second tape support member, means for moving one of said members with respect to the other between a first position in which the end of said first tape is aligned with the end of said second tape and a second position in which the end of said first tape is aligned with the end of said third tape.

16. A splicer head assembly according to claim 15 wherein at least one of said means for holding tape is a means for applying suction to a tape on said tape support member.

17. A splicer head assembly according to claim 15 wherein said means for moving one of said members comprises a slide rod which supports said one member, said one member being mounted for reciprocal straight-line movement between said first and second positions.

References Cited

UNITED STATES PATENTS

| | | | |
|---|---|---|---|
| 3,637,153 | 1/1972 | King | 156—506 X |
| 3,582,009 | 6/1971 | Ceroll | 156—506 X |

PHILIP DIER, Primary Examiner

U.S. Cl. X.R.

156—506, 544; 242—56, 58.4